(12) United States Patent
Takayama

(10) Patent No.: US 6,192,285 B1
(45) Date of Patent: Feb. 20, 2001

(54) CONTROLLER FOR WORK TRANSFER SYSTEM

(75) Inventor: Yukiyoshi Takayama, Komatsu (JP)

(73) Assignee: Komatsu Ltd., Tokyo (JP)

( * ) Notice: Under 35 U.S.C. 154(b), the term of this patent shall be extended for 0 days.

(21) Appl. No.: 09/147,194

(22) PCT Filed: May 14, 1997

(86) PCT No.: PCT/JP97/01614

§ 371 Date: Oct. 26, 1998

§ 102(e) Date: Oct. 26, 1998

(87) PCT Pub. No.: WO97/44149

PCT Pub. Date: Nov. 27, 1997

(30) Foreign Application Priority Data

May 23, 1996 (JP) .................................................. 8-128120

(51) Int. Cl.[7] .............................. B21D 43/05; B05B 19/18
(52) U.S. Cl. .................................. 700/56; 700/57; 700/59; 700/60; 700/214; 700/217; 700/220; 72/405.01; 72/405.09; 72/405.11; 72/405.13; 72/405.16; 318/625; 318/632; 318/645; 318/34; 318/85
(58) Field of Search ...................... 700/56–62, 213–220; 72/1, 405.01, 405.09, 405.11, 405.13, 405.16; 318/625, 632, 634, 645, 34, 45, 66–69, 85

(56) References Cited

U.S. PATENT DOCUMENTS 5,052,298 * 10/1991 Runyan et al. ....................... 101/365
5,913,932 * 6/1999 Takayama ........................ 72/405.09
5,947,865 * 9/1999 Watanabe et al. .................... 477/169
5,952,808 * 9/1999 Umeji ................................... 318/625
5,970,763 * 10/1999 Takayama .................................. 72/1
5,989,146 * 11/1999 Brown et al. ......................... 475/207
6,071,207 * 6/2000 Stephens et al. ..................... 475/204

FOREIGN PATENT DOCUMENTS

| 53-18879 | 2/1978 | (JP) . |
| 55-122639 | 9/1980 | (JP) . |
| 6-262280 | 9/1994 | (JP) . |
| 6-269875 | 9/1994 | (JP) . |

* cited by examiner

Primary Examiner—Paul P. Gordon
Assistant Examiner—Ramesh Patel
(74) Attorney, Agent, or Firm—Armstrong, Westerman, Hattori, McLeland & Naughton

(57) ABSTRACT

A controller for a work transfer system, capable of performing precise positioning of feed bars during sole driving of the transfer system and simplified in structure to contribute to savings in installation space and cost. The controller has a cam angle detector mounted on a cam shaft for feed cams and controls servo motors for respective lift bars according to information which is related to cam angle of the feed cams detected by the cam angle detector and looked up in a motion table set by a transfer controlling PLC serving as a motion table setting means.

5 Claims, 4 Drawing Sheets

CONTROLLER FOR WORK TRANSFER SYSTEM

TECHNICAL FIELD

The present invention relates to a controller for a work transfer system, which controls feed bars to move in the direction of a feed axis through feed cams and in the direction of a lift axis by means of a multiple servo driver mechanism.

BACKGROUND ART

Generally, transfer presses are equipped with a transfer system for transferring a workpiece in and out of a work station in timed relation with performance of a sequence of pressing operations. Such a transfer system includes a pair of juxtaposed feed bars extending in a workpiece feed direction and cross bars each spanned between these feed bars. A known transfer system conveys workpieces held by vacuum caps by vacuum adsorption, these vacuum caps being attached to the cross bars. Another known transfer system conveys workpieces gripped at both sides by fingers attached to the feed bars. In this case, the pair of feed bars perform two-dimensional or three-dimensional movement to transfer an individual workpiece from one station where a set of dies are disposed to the next adjacent station where another set of dies are disposed.

The most typical method for driving the feed bars is a mechanical driving method in which the feed bars are driven, being linked to the press system with a cam and link mechanism. This method is characterized in that the movement of the feed bars in a feed direction is determined by the feed cams whereas the movement of the feed bars in a lift direction is determined by the lift cams and the aforesaid two-dimensional movement is achieved by combining the movements in the feed and lift directions.

The mechanical driving method, however, reveals the following drawbacks.

(1) The complicated driving system makes maintenance difficult.

(2) The feed bars cannot be supported at more than three positions because of limited space, which requires increased rigidity in the feed bars in order to restrict mechanical vibration. This causes an increase in the weight of the feed bars and, in consequence, an increase in the size of the driving system for the feed bars.

(3) Since the driving system for the feed bars is long, the rigidity of the driving system needs to be increased in order to ensure accuracy in positioning each feed bar.

(4) The feed bars need to be retracted in an upward direction to let the moving bolster out of the press system during replacement of dies, which gives rise to a need for forced lift cylinders.

(5) The installation level of the feed bars is not adjustable according to dies.

(6) The movement of the feed bars is fixedly determined by the cams so that the movement cannot be optimized according to dies to be used.

As an attempt to solve these problems, Japanese Patent Publication (KOKAI) No. 6-262280 (1994) discloses a method for driving the feed bars in a lift direction with motors (servo motors) different from the motor for the press system. In the transfer feeder according to this publication, a pair of lift beams are driven vertically with a lift mechanism having servo motors as a driving source, and cross bar carries attached to the lift beams are driven in a feed direction with a feed mechanism having feed cams as a driving source, the feed cams being rotated by power taken out of the main body of the press system.

Transfer presses having such a transfer feeder are designed to detect the cam angle of the feed cams by a cam angle detector and control each servo motor based on the detected cam angle, that is, the press angle, thereby to drive the transfer system in synchronization with the motion of the press system.

The prior art transfer press of the above type has a difficulty in driving the transfer system in a lift direction when solely driving the transfer system with the feed cams disconnected from the press system, because the cam angle detector is installed on the side of a main motor for driving the press slide.

In addition, the prior art transfer press presents another disadvantage in its structure wherein lift beams are suspended from above using rack bars incorporated in the lift mechanism, which involves large-sized servo motors due to the influence of gravity and therefore leads to large installation space as well as an increase in production cost.

The present invention is directed to overcoming the foregoing problems and it is therefore one of the objects of the invention to provide a controller for a work transfer system which is capable of precisely positioning the feed bars even when the transfer system is solely driven and simplified in its structure to contribute to savings in installation space and cost.

DISCLOSURE OF THE INVENTION

The above object can be accomplished by a controller for a work transfer system according to the invention, which moves feed bars in the direction of a feed axis through feed cams and in the direction of a lift axis by means of a multiple servo driver mechanism and which comprises:

(a) a cam angle detector attached to a cam shaft for the feed cams;

(b) motion table setting means for setting, according to input data entered from outside, a motion table indicative of a locus of movement of the feed bars; and (c) controller means for controlling respective servo motors for lift bars according to information which is related to the cam angle of the feed cams detected by the cam angle detector and looked up in the motion table set by the motion table setting means.

It should be noted that the definition of the "feed bars" disclosed in the present invention includes lift beams such as disclosed in Japanese Patent Publication (KOKAI) No. 6-262280 (1994). The lift beams do not move in a workpiece conveying direction but move in a vertical direction only and are designed to carry cross bar carriers mounted thereon, these cross bar carriers being freely movable in a conveying direction.

According to the invention, the motion table setting means sets a motion table according to data entered through, for example, an operation panel installed outside the controller. Then, the cam angle of the feed cams is detected by the cam angle detector attached to the cam shaft, and each servo motor for a lift bar is controlled, according to information related to the cam angle detected by the cam angle detector and looked up in the motion table. In this way, each lift bar is moved, according to the cam angle, to positions corresponding to the motion specified by the motion table. For synchronously driving the press system and the transfer system, the press system and the feed bars are, first, synchronously driven and the servo motors are driven according to detection by the cam angle detector, whereby the press system and the feed bars can be synchronously driven. According to the invention, since a motion table suited for dies to be used is set according to data entered from outside, the lift motion for the feed bars can be arbitrarily changed. Therefore, an optimum lift motion for dies to be used can be set, resulting in improved productivity. In addition, the cam angle detector is attached to the cam shaft of the feed cams and therefore even when the drive lines for the main motors are disconnected from the feed cams during sole driving of the transfer system, the servo motors can be driven according to the cam angle.

The motion table is preferably a look-up table indicative of lift strokes for a plurality of lift bars in relation to press angles.

In the invention, the feed cams are normally driven by a first driving means for driving a press slide, but when the transfer system is solely driven, the drive line for the first driving means is disconnected and they are driven by a second driving means. Accordingly, the cam shaft can be driven by its own driving means during sole driving of the transfer system, which makes it possible to easily perform slow speed driving or precise positioning without use of an encoder for sole driving or the like for example when having a trial of new dies. By virtue of this arrangement, a visual check can be made to determine whether feed bars are in smooth movement during a trial of new dies or whether the cross bars or the vacuum caps for workpiece adsorption attached to the cross bars are in proper adsorbing positions relative to the dies during the movement of the feed bars.

The invention also includes a plurality of balance cylinders for supporting the feed bars so as to be suspended therefrom and a pressure controlling means for controlling fluid pressure within these balance cylinders to be constant at all times. With this arrangement, whatever level the feed bars are positioned, the weight of the feed bars etc. can be borne by the balance cylinders thereby substantially eliminating the influence of gravitational acceleration. This contributes to miniaturization of servo motors and to savings in installation space and cost. Preferably, the balance cylinders disclosed herein are air cylinders. Based on detection data on air pressure within the respective cylinder chambers of these air cylinders, the pressure controlling means controls opening and closing of air valves within air pipelines connected to the cylinder chambers to control air pressure within the cylinder chambers.

BEST MODE FOR CARRYING OUT THE INVENTION

With reference to the drawings, a controller for a work transfer system constructed according a preferred embodiment of the invention will be hereinafter described.

Figure 1:
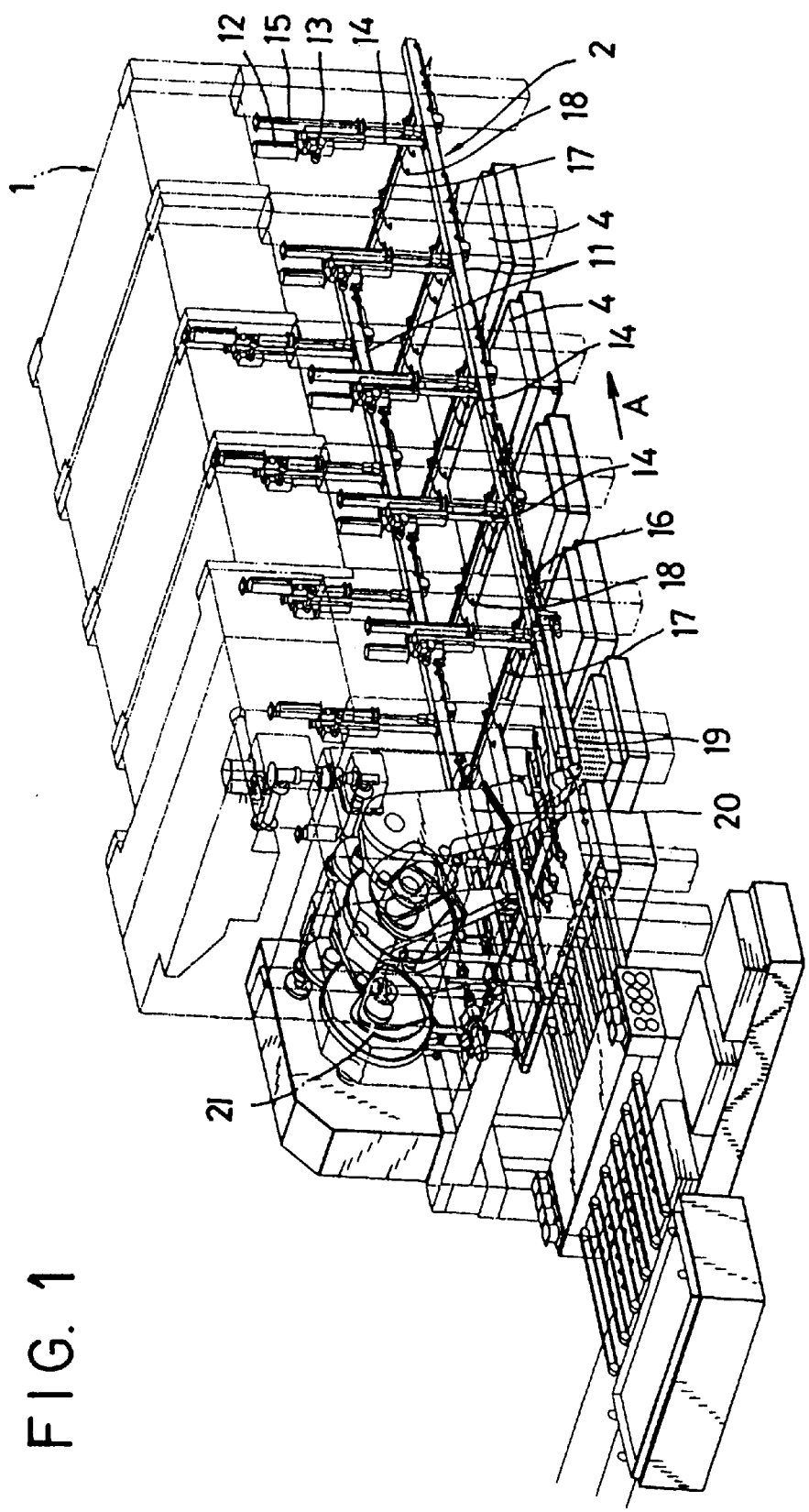
FIG. 1 is a schematic general perspective view of a transfer press according to one embodiment of the invention.
Figure 2:
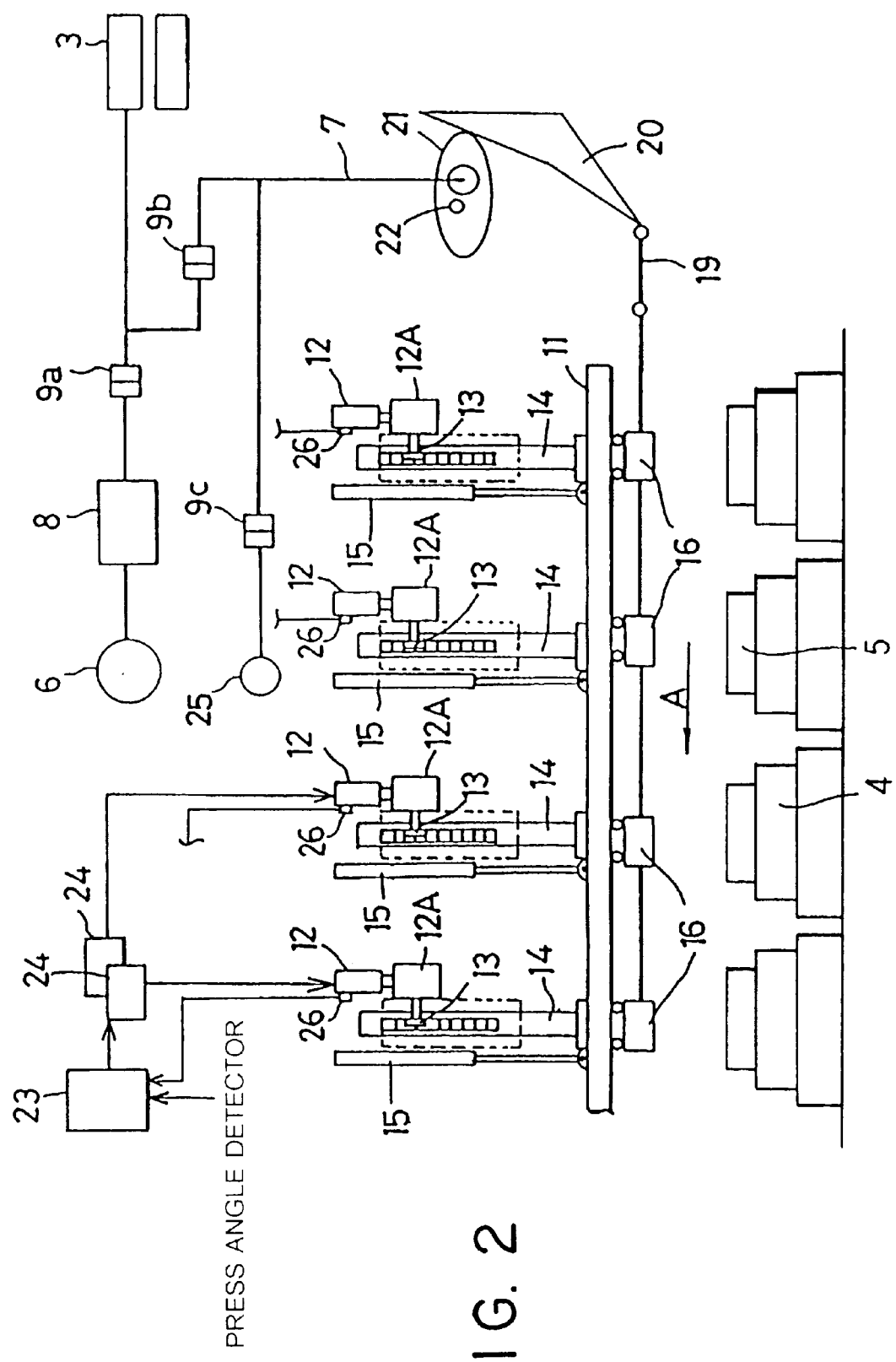
FIG. 2 is a diagram showing the structure of the transfer press of the embodiment.

FIG. 1 schematically depicts a general, perspective view of a transfer press constructed according to one embodiment of the invention, and FIG. 2 diagrammatically depicts the structure of this transfer press. As shown in FIG. 1, the transfer press according to this embodiment comprises a press system 1 and a transfer system 2. The press system 1 has a series of work stations which perform successive pressing operations on each workpiece (not shown) whereas the transfer system 2 is disposed within the press system 1, for transferring the workpieces in the feeding direction A.

The press system 1 includes a press slide 3 which is reciprocable vertically by slide driving mechanisms spanned at the respective work stations. Upper dies are attached to the underside of the press slide 3 while lower dies 5 are so attached to moving bolsters 4 as to respectively face their corresponding upper dies so that pressing operations can be performed on the respective workpieces placed between these dies. Each of the slide driving mechanisms comprises a main motor 6 controlled according to signals from a press controller; a drive shaft 7 driven by the main motor 6; a flywheel 8 attached to the drive shaft 7; clutches 9a, 9b; and a brake (not shown).

The transfer system 2 has a pair of feed bars 11 juxtaposed so as to extend in the workpiece feeding direction A, being suspended from above by means of lift mechanisms attached to the press system 1. Each lift mechanism includes a pinion 13 rotatable by a servo motor 12 through reduction gears 12A and a rack bar 14 which meshes with the pinion 13. The feed bars 11 are supported at the respective lower ends of the rack bars 14 and driven by the servo motors 12 so as to move vertically in synchronous relation with the movement of the press system 1. Balance cylinders 15 are disposed at positions adjacent the respective rack bars 14, for maintaining a balance between the fluid pressure imposed on each balance cylinder 15 and the weight of the feed bars 11 etc. In this embodiment, five servo motors 12 are aligned at equal intervals on both sides so that the ten servo motors 12, in total, cooperate to lift or lower the pair of feed bars 11.

Supported on the undersides of the feed bars 11 are a plurality of cross bar carriers 16 which are spaced in the feeding direction A so as to be movable back and forth in the feeding direction A. A cross bar 17 is spanned between each opposing pair of cross bar carriers 16 so as to extend in a direction perpendicular to the feeding direction A. The cross bars 17 respectively have vacuum cups 18 attached thereto for adsorbing the workpieces.

The cross bar carriers 16 adjacent to each other in the feeding direction A are coupled to each other by a coupling rod so that all the cross bar carriers 16 can simultaneously move both in the feeding direction A and in the direction opposite thereto. The most upstream cross bar carrier 16 attached to each feed bar 11 is connected to the distal end of each cam lever 20 by means of a coupling rod 19. The base end of each cam lever 20 abuts on a feed cam 21 which is rotatable by power delivered from the press system 1. The rotation of the feed cams 21 brings the cam levers 20 in rocking movement thereby moving the cross bar carriers 16 back and forth in the feeding direction A.

The angle of rotation of each drive shaft 7 is detected by a press angle detector (cam angle detector) 22 attached to the cam shaft of the feed cams 21 and according to this detected press angle, each servo motor 12 is controlled by a transfer system controller 23 through its servo amplifier (servo driver) 24. With this arrangement, the cross bar carriers 16 of the transfer system 2 reciprocate in the feeding direction A synchronously with the movement of the press system 1 so that the vacuum cups 18 attached to the cross bars 17 successively transfer the adsorbed workpieces to the respective work stations.

Each servo motor 12 has a position detector (encoder) 26 for detecting the present position of the servo motor 12 and positional signals from these position detectors 26 are entered in the transfer system controller 23. The transfer system controller 23 calculates the difference between present position data sent from the position detector 26 and press angle data sent from the press angle detector 22 and releases a movement command to each servo motor 12 through each servo amplifier 24 to make the difference equal to zero.

There is provided an independent motor 25 for use in sole driving of the transfer system 2, and each drive shaft 7 is also driven by the independent motor 25 through a clutch 9c.

A driving system having the main motors 6 as a driving source is a first driving means while a driving system having the independent motor 25 as a driving source is a second driving means.

Figure 3:
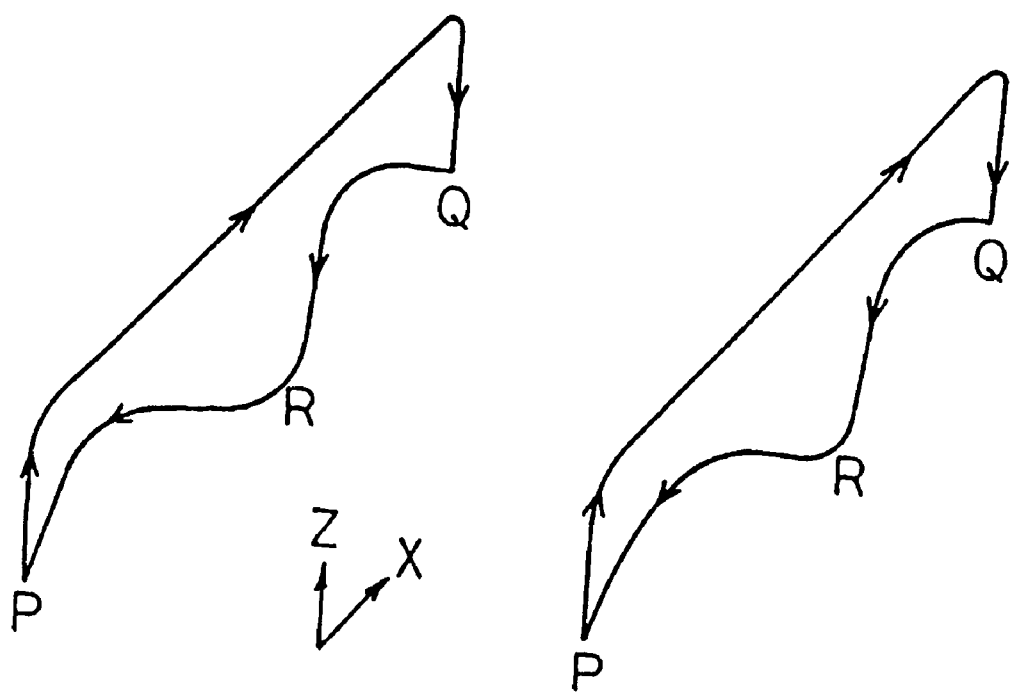
FIG. 3 is a diagram showing an example of motion patterns for a transfer system.

The transfer system 2 is driven according to a specified motion pattern in order to avoid the interference between the dies and the workpieces being transferred by the transfer system 2. FIG. 3 shows, as one example of this motion pattern, a two-dimensional motion pattern for performing a two-dimensional movement of the cross bars 17 in the direction of X-axis (feed direction) and in the direction of Z-axis (lift direction). According to this example, for moving onto the lower die of the previous work station, the transfer system 2 is first lifted at the stand-by point R, and then moved down to the adsorbing point P. At the adsorbing point P, the transfer system 2 adsorbs the workpiece to lift out of the lower die of the previous work station in the direction of Z-axis and then conveys it in the direction of X-axis to the position above the lower die of the next work station. To place the workpiece in this lower die, the transfer system 2 is lowered in the direction of Z-axis to release the workpiece at the releasing point Q. After releasing, the transfer system 2 is lifted and then moved back downwardly to the stand-by point R thereby terminating one cycle.

Figure 4:
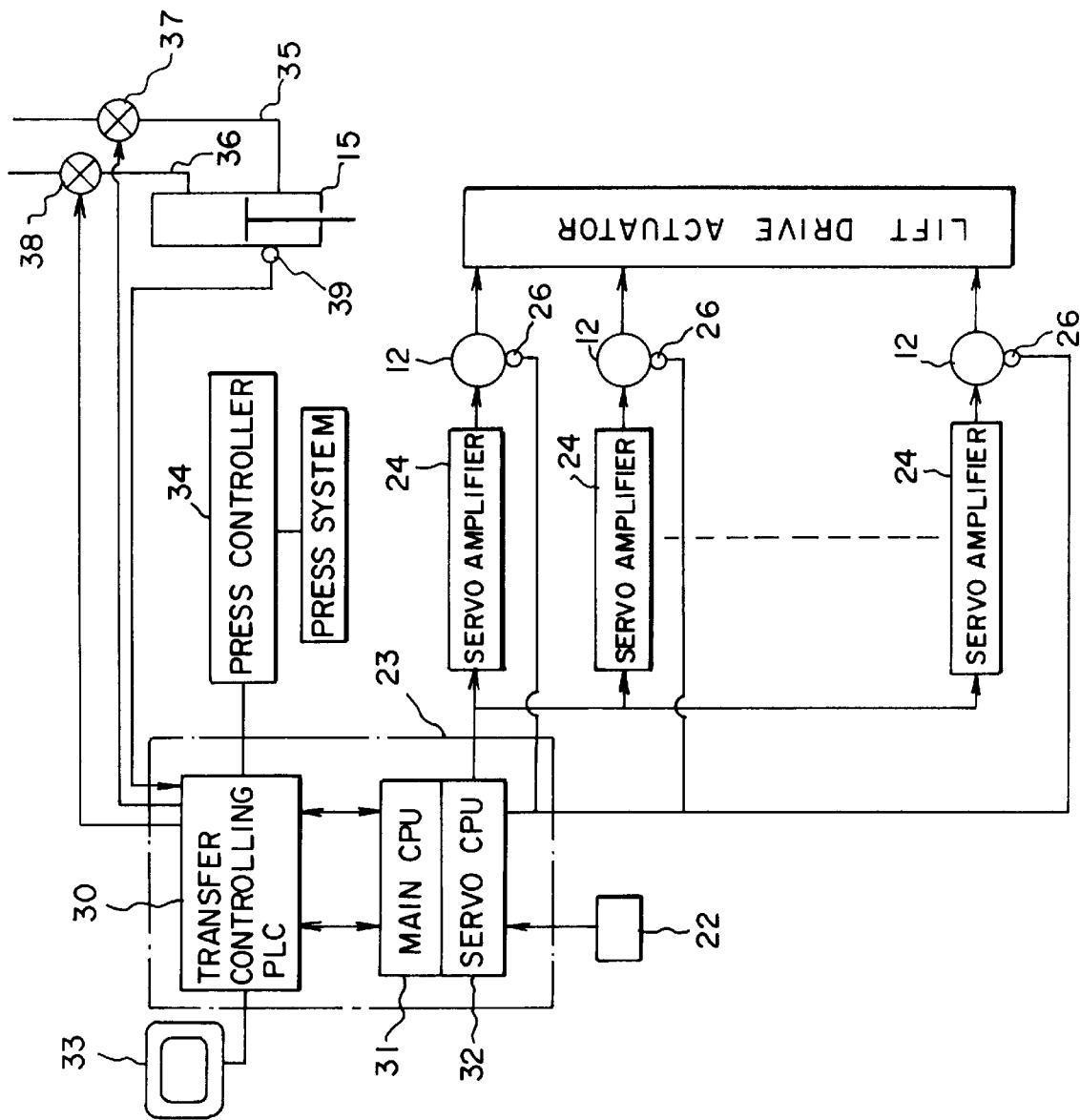
FIG. 4 is a diagram showing the system configuration of the transfer press of the embodiment.

As shown in FIG. 4, the transfer system controller 23 comprises a general CPU section (transfer controlling PLC) 30 serving as a motion table setting means; and a controlling CPU section composed of a main CPU 31 and a servo CPU 32 serving as a controller means for servo motors 12. The general CPU section 30 prepares a motion table based on stroke and index angle data sent from an external operation panel 33 and releases this motion table to the servo CPU 32. The motion table disclosed herein represents lift strokes for ten lift bars (rack bars 14) and the lift strokes are respectively determined in relation to press angles (0° to 360°).

By virtue of this arrangement, a motion table, that is, a motion pattern (motion curve) can be arbitrarily set or changed according to the type of dies to be used. In addition, the general CPU section 30 identifies lift bar data such as the present position of each lift bar, a deviation from synchronization and a loss of appropriate spacing between adjacent lift bars, and issues a suspension command to a press controller 34. Thus, judgement associated with interlocking is separated from the role of the servo CPU 32 and assigned to the general CPU section 30, which lessens the burden on the servo CPU 32 thereby to contribute to an improvement in the accuracy of the servo system.

Looking up information related to the cam angle detected by the cam angle detector 22 attached to the cam shaft, in the motion table sent from the general CPU section 30, the servo CPU 32 issues a moving command to each servo motor 12 through its servo amplifier 24.

During sole driving of the transfer system 2, the clutches 9b within the drive lines connected to the main motors 6 are disengaged and the clutch 9c within the drive line connected to the independent motor 25 is engaged, in order that the feed cams 21 are driven by the independent motor 25. According to the present embodiment, since the press angle detector (cam angle detector) 22 is attached to the cam shaft of the feed cams 21, the servo motors 12 can be driven according to the cam angle without use of an encoder for solo driving when the main motor drive lines are disconnected from the feed cams 21 during solo driving of the transfer system. Therefore, slow speed driving or precise positioning of the feed bars 11 at the time of a trial of new dies can be easily carried out.

Reference is now made to FIG. 4 to describe the pressure control for the balance cylinders 15 which are used for maintaining a balance between the fluid pressure imposed on the balance cylinders 15 and the weight of the feed bars 11 etc.

Each balance cylinder 15 is an air cylinder and provided with air pipelines 35, 36 for supplying air to its head side and bottom side and with air valves 37 and 38 disposed within the air pipe lines 35, 36 respectively. These air valves 37, 38 are controlled to open or close in response to a command from the general CPU section 30 of the transfer system controller 23 which serves as a pressure controlling means. The general CPU section 30 inputs, as information used for performing this control, detection data from a pressure sensor 39 for detecting air pressure within the cylinder chambers of the balance cylinders 15.

In the above arrangement, when the pressure sensor 39 senses that the air pressure on the head side of each cylinder exceeds a predetermined upper limit, air on the head side is allowed to leak to the outside trough an air valve 37 while the bottom side being supplied with air through an air valve 38. On the other hand, when it is sensed that the air pressure on the head side is below a predetermined lower limit, air is supplied to the head side through the air valve 37 while air on the bottom side being allowed to leak to the outside. In this way, the internal pressure of each cylinder is controlled in real time to be constant at all times, which allows the servo motors 12 to be free from the influence of the weight of the feed bars 11 and the like whatever level the feed bars 11 are located.

In the transfer press of the present embodiment, since the cam angle detector 22 is mounted on the cam shaft of the feed cams 21, even when the drive lines of the main motors 6 are disconnected from the feed cams 21 during sole driving of the transfer system, the cam shaft can be driven by the independent motor 25 which enables it to drive the servo motors 12 according to the cam angle. Therefore, slow speed driving or precise positioning can be easily carried out without use of an encoder for solo driving etc. during a trial of new dies, so that it becomes possible to visually check whether the feed bars 11 are being smoothly moved during a trial of new dies or whether the cross bars 17 or the vacuum caps 18 for workpiece adsorption attached to the cross bars 17 are in proper adsorbing positions relative to the dies during the movement of the feed bars 11.

Since the feed bars 11 are supported at a multiplicity of points, the mechanical vibration of the feed bars 11 can be restricted and the weight of the feed bars 11 can be reduced without impairing its rigidity. Additionally, operation for forcedly lifting the feed bars 11 at the time of die replacement can be performed with the servo motors 12, which eliminates the need for the conventionally used forced lift cylinders and shortens the time required for lifting. Further, since the lift motion of the feed bars 11 can be arbitrarily altered by setting a motion table according to input data entered from outside, this lift motion can be optimized so as to conform to the dies to be used and so as not to cause mechanical vibration. This contributes to an improvement in the productivity of the transfer press.

Finally, according to the invention, the balance cylinders 15 sustain the weight of the feed bars 11 etc., resulting in miniaturization of the servo motors 12 and savings in installation space and cost.

What is claimed is:

1. A controller for a work transfer system, which moves feed bars in the direction of a feed axis through feed cams and in the direction of a lift axis by means of a multiple servo driver mechanism and which comprises:

(a) a cam angle detector attached to a cam shaft for the feed cams;
   (b) motion table setting means for setting, according to input data entered from outside, a motion table indicative of a locus of movement of the feed bars; and
   (c) controller means for controlling respective servo motors for lift bars according to information which is related to the cam angle of the feed cams detected by the cam angle detector and looked up in the motion table set by the motion table setting means.

2. A controller for a work transfer system according to claim 1, wherein said motion table is preferably a look-up table indicative of lift strokes for a plurality of lift bars in relation to press angles.

3. A controller for a work transfer system according to claim 1, wherein said feed cams are normally driven by first driving means for driving a press slide and driven by second driving means with a drive line for the first driving means being disconnected from the feed cams during sole driving of the work transfer system.

4. A controller for a work transfer system according to any one of claim 1 or 2 or 3 further comprising a plurality of balance cylinders for supporting said feed bars so as to be suspended therefrom and pressure controlling means for controlling fluid pressure within said balance cylinders to be constant at all times.

5. A controller for a work transfer system according to claim 4, wherein said balance cylinders are air cylinders and wherein said pressure controlling means controls, based on detection data on air pressure within the respective cylinder chambers of the air cylinders, opening and closing of air valves within air pipelines respectively connected to said cylinder chambers, thereby controlling air pressure within said cylinder chambers.

* * * * *